May 4, 1965        J. H. HOLLYDAY        3,181,892
HITCH
Filed April 29, 1963
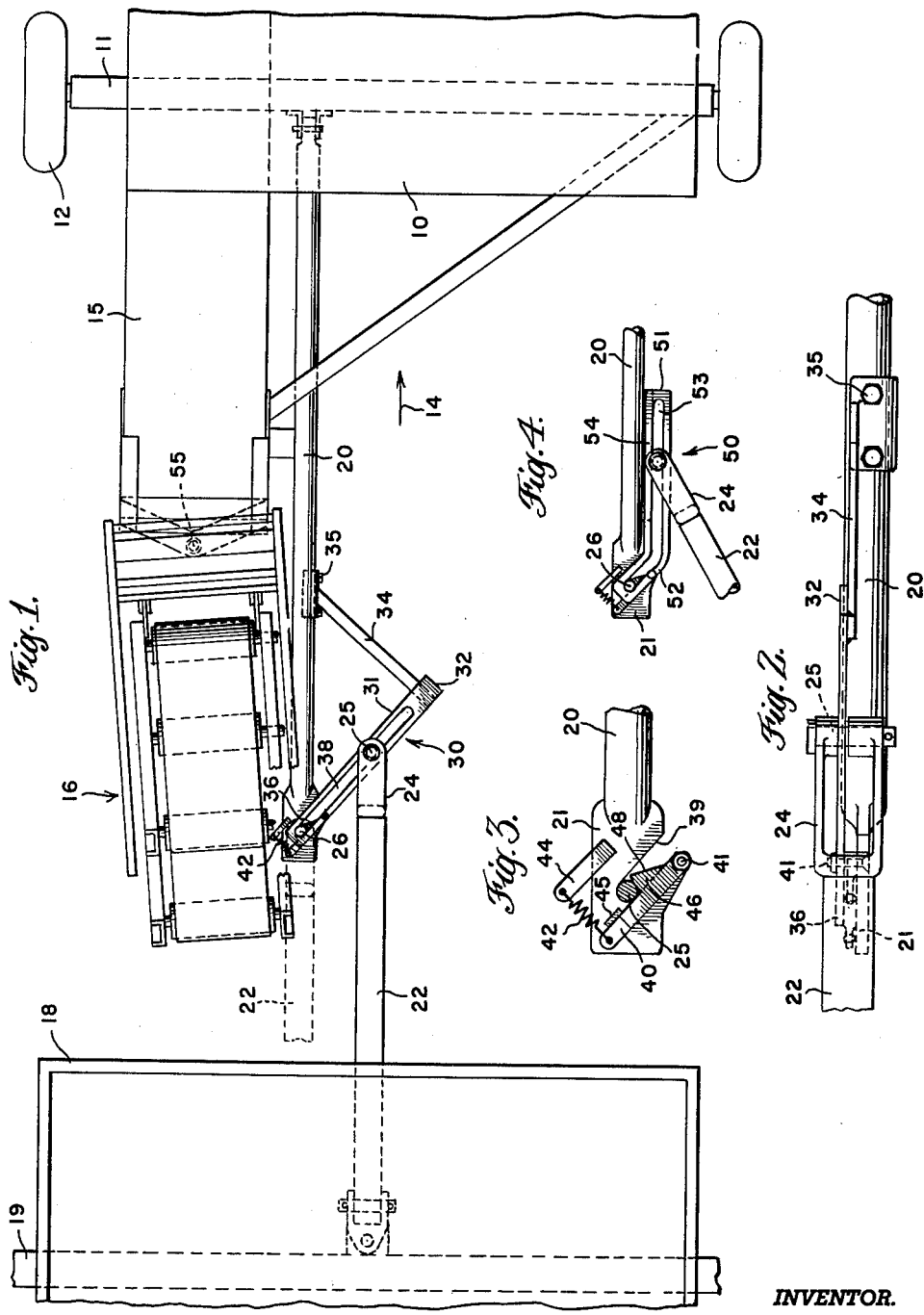
INVENTOR.
JAMES H. HOLLYDAY
BY *Joseph A. Brown*
ATTORNEY

United States Patent Office 3,181,892
Patented May 4, 1965

3,181,892
HITCH
James H. Hollyday, New Holland, Pa., assignor to Sperry Rand Corporation, New Holland, Pa., a corporation of Delaware
Filed Apr. 29, 1963, Ser. No. 276,599
4 Claims. (Cl. 280—477)

This invention relates generally to hitches and more particularly to a hitch device whereby a wagon tongue may be conveniently connected to a hitch member on an implement.

When a wagon is hitched to a farm implement such as a baler, forage harvester or the like, more than common skill is required in positioning the implement relative to the wagon so that an easy hitching may take place. The hitch point of the wagon tongue must be in register with the hitch point of the implement so that a pin may be used to provide a connection. If the implement is too close or too far from the wagon, a hitch point register will not occur. Then, it is necessary to move the wagon to a proper location. Such movement is of no particular problem if the operator has a helper. In such case, one person can handle the wagon tongue and hitch pin while the other rolls the wagon. However, it will be appreciated that when an operator is alone, the hitching procedure may be quite difficult if the hitch points do not happen to line up.

One object of this invention is to provide a hitch device for use in connecting a wagon tongue to an implement hitch.

Another object of this invention is to provide a hitch device whereby an implement need only be generally located relative to a wagon to enable quick and easy hitching of the wagon tongue to the implement.

Another object of this invention is to provide a hitch device of the character described wherein a wagon tongue is first temporarily connected to a secondary hitch member and thereafter the connection point is slid to a location providing a main hitch connection.

A further object of this invention is to provide a hitch device which is so constructed that when used on a baler having a bale thrower, it will not interfere with the normal swinging operation of the thrower.

A still further object of this invention is to provide a hitch device which is relatively simply constructed and low in cost.

Other objects of this invention will be apparent hereinafter from the specification and from the recital in the appended claims.

In the drawing:

FIG. 1 is a fragmentary plan view showing a baler and a wagon located in trailing relation thereto, a hitch device constructed according to this invention being provided for connecting the tongue of the wagon to a hitch member on the baler;

FIG. 2 is an enlarged fragmentary side elevation of the hitch device shown in FIG. 1;

FIG. 3 is a fragmentary plan view showing the hitch pin seated in the main hitch member of the implement; and FIG. 4 is a fragmentary plan view of a hitch device constructed according to another embodiment of this invention.

Referring now to the drawing by numerals of reference, and first to FIG. 1, 10 denotes a hay baler having a frame 11 supported by ground wheels 12. The baler is adapted to travel in a forward direction indicated by the arrow 14. Along the left hand side of the baler facing forwardly is a bale case 15 in which bales are formed, each bale being discharged rearwardly upon completion. Mounted on the rearward end of the bale case 15 is a bale thrower 16 which receives each bale to traject it to trailing wagon 18. The wagon has a frame 19 supported by ground wheels, not shown.

So that the wagon 18 may be towed in trailing relation to baler 10, the baler is provided with a rearwardly extending pipe 20 having a fixed, main hitch member 21 at the rearward end thereof. The wagon has a tongue 22 provided with a clevis 24 at its forward end. A hitch pin 25 is provided for use in connecting tongue 22 to the fixed baler hitch member 21. Pin 25 is extendable through clevis 24 and through an opening or hole 26 in hitch member 21 to connect the parts. It will be understood that to connect the clevis to the hitch member, the holes in the respective members must be in vertical register to permit the insertion of the pin 25. To enable a quick and easy connection of tongue 22 with hitch member 21, a device 30 is provided constructed according to this invention.

The hitch device 30 comprises an elongated, rectilinear, secondary hitch member or bracket 31 which extends diagonally relative to the direction of travel of the baler. At its forward end 32, bracket 31 is carried on a support arm 34 connected to pipe 20 by bolts 35. At its rearward end 36, bracket 31 overlies fixed hitch member 21. As shown, bracket 31 has an elongated guide slot 38 which extends from substantially one end of the bracket to the other. At its rearward end, the slot 38 overlies opening 26. In connecting the tongue 22 to the baler hitch, clevis 24 is first connected by pin 25 to bracket 31 by projecting the pin 25 downwardly through the slot 38. When the baler is slowly towed forwardly, pin 25 is caused to slide through slot 38 and toward fixed hitch member 21. As shown best in FIG. 3, member 21 has an inlet slot 39 which registers with hole 26. It also registers with the slot 38 in bracket 31 to provide for the passage of the hitch pin 25 to the hole 26 in hitch member 21.

Supported on baler hitch member 21 is latch means comprising lever 40 pivotally connected at 41 for swinging movement about a vertical axis. Lever 40 is pivoted in a clockwise direction when viewed as shown in FIG. 3 by a spring 42 fastened to it and connected to a fixed member 44. The movement of lever 40 in a clockwise direction is limited by a stop 45.

Lever 40 normally extends parallel to inlet slot 39 in member 21. The lever has a detent 46 which overlies slot 39. A cam surface 48 is provided on the detent which extends diagonally to the extension of slot 39. When hitch pin 25 slides along guide slot 38 and enters inlet slot 39 in hitch member 21, it engages cam surface 48 and causes lever 40 to pivot in a counterclockwise direction so that the pin 25 may enter hole 26. Once the pin 25 reaches hole 26, spring 42 becomes effective to pull lever 40 in a clockwise direction and back to normal position wherein detent 46 drops in behind the hitch pin and prevents its movement outwardly of the slots 38 and 39.

With the described hitch device 30, the baler 10 has only to be generally positioned relative to the wagon 18. If the operator is alone, he merely has to swing tongue 22 in a lateral direction until the clevis 24 lines up with the bracket 31. Then pin 25 is passed through the clevis and slot 38 to provide a temporary connection. Then the operator returns to the tractor for towing the baler and moves the baler forwardly. As the baler advances, hitch pin 25 slides rearwardly through diagonal slot 38 to the hitch member 21 where it passes through slot 39 to hole 26 where it is latched in hitching position by detent 46. Since the bracket 31 merely serves to guide pin 25, it may be lightly constructed. The hitching load of the wagon is carried by the fixed hitching member 21, made substantially stronger. The structure employed is relatively simple and it can be manufactured and assembled at low cost.

Referring now to FIG. 4, a hitch device 50 is shown and constructed according to another embodiment of this invention. In this figure, the parts which are the same as parts shown in FIGS. 1–3 have like numerals. Support arm 34 has been eliminated and as shown a bracket 51 is provided having a rear diagonal portion 52 and a portion 54 which extends parallel to the pipe 20. A slot 53 in member 51 follows the respective portions of the bracket. Hitching tongue 22 to bracket 51 is done in the same manner as employed in connecting the tongue to bracket 31. The advantage of the structure of FIG. 4 is that hitch device 50 is kept in close to pipe 20 and out of the way, although as accessible as the structure shown in FIG. 1.

With either the hitch device 30 or 50, there is no interference with the bale thrower 16 mounted on the bale case 15. The hitch structures extend in horizontal planes and the slots and openings extend vertically. The bale thrower is free to swing laterally relative to the bale case 15 about the pivot axis 55 (FIG. 1) and such movements are not hindered by the hitch constructions.

While this invention has been described in connection with a particular embodiment thereof, it will be understood that it is capable of modification, and this application is intended to cover any variations, uses or adaptations following, in general, the principles of the invention and including such departures from the present disclosure as come within known or customary practice in the art to which the invention pertains, and as fall within the scope of the invention or the limits of the appended claims.

Having thus described my invention, what I claim is:

1. A hitch device whereby a forwardly extending tongue of a wagon or other vehicle may be conveniently connected to a baler or other implement and towed in trailing relation thereto comprising a hitch member located at a rearward portion of the implement and affixed thereto, said hitch member having a rigid immovable end portion, said end portion having an inlet slot therein, said inlet slot extending diagonally rearwardly to a location within the hitch member end portion and forming a vertical opening, a bracket on said implement having a guide slot elongated in a horizontal and fore-and-aft direction, said guide slot having a rearward portion in alignment with said open end of said inlet slot, said tongue being positionable over said bracket and along said guide slot, a hitch pin extendible vertically through and loosely connectable to said tongue and adapted to be projected through any portion of said guide slot after said tongue is positioned to provide a slidable connection of said tongue to said bracket, said bracket moving relative to said pin on forward travel of said implement and said pin being guided to said inlet slot and deposited in said hitch member opening, and latch means projectable across said inlet slot for holding said pin in said opening after the pin is guided thereto.

2. A hitch device as recited in claim 1 wherein said latch means comprises a detent pivotally supported on said hitch member and normally extending across said inlet slot, a cam surface on said detent with which said pin is engageable on travel to said opening to temporarily move said detent from said normal position, and spring means biasing said detent to normal position.

3. A hitch device as recited in claim 1 wherein said bracket extends diagonally forwardly from said hitch member opening and then forwardly in a direction generally parallel to ground travel.

4. A hitch device as recited in claim 1 wherein said latch means comprises a lever having one end pivotally connected to said hitch member adjacent said opened end of said inlet slot and normally extending parallel to such slot, a spring connected between said hitch member and an opposite end of said lever to bias the lever toward said inlet slot, and a detent on said lever normally extending across said inlet slot and having a cam face diagonal to the slot.

References Cited by the Examiner

UNITED STATES PATENTS

| 2,269,023 | 1/42 | Hendricks | 280—477 |
| 3,054,626 | 9/62 | Gerber | 280—478 |

FOREIGN PATENTS 144,944  4/54  Sweden.

A. HARRY LEVY, *Primary Examiner.*

KENNETH H. BETTS, *Examiner.*